United States Patent [19]

Tuckey

[11] Patent Number: 4,807,582
[45] Date of Patent: * Feb. 28, 1989

[54] RESERVE FUEL SHUT-OFF VALVE
[75] Inventor: Charles H. Tuckey, Cass City, Mich.
[73] Assignee: Walbro Corporation, Cass City, Mich.
[*] Notice: The portion of the term of this patent subsequent to May 31, 2005 has been disclaimed.
[21] Appl. No.: 49,537
[22] Filed: May 14, 1987

Related U.S. Application Data

[63] Continuation-in-part of Ser. No. 928,184, Nov. 7, 1986, Pat. No. 4,747,388.
[51] Int. Cl.$^4$ .............................................. F02M 37/10
[52] U.S. Cl. .................................... 123/514; 123/516; 137/113; 137/399; 137/572; 137/907
[58] Field of Search ............... 137/111, 113, 399, 571, 137/572, 574, 576, 907; 123/509, 510, 514, 516

[56] References Cited
U.S. PATENT DOCUMENTS

| 1,801,447 | 4/1931 | Muzzy | 137/113 |
| 2,613,922 | 10/1952 | Gatchet | 137/395 X |
| 2,998,056 | 8/1961 | Capehart | 137/113 X |
| 3,118,492 | 1/1964 | Stone | 123/514 X |
| 3,158,193 | 11/1964 | Anderson | 137/113 X |
| 4,279,232 | 7/1981 | Schuster et al. | 123/516 |
| 4,546,750 | 10/1985 | Brunell et al. | 123/509 X |

FOREIGN PATENT DOCUMENTS 2172864 10/1986 United Kingdom .

Primary Examiner—Stephen Hepperle
Attorney, Agent, or Firm—Barnes, Kisselle, Raisch, Choate, Whittemore & Hulbert

[57] ABSTRACT

A fuel system for internal combustion engines which includes a fuel reservoir canister containing an electric fuel pump mounted in a fuel tank. A diaphragm-controlled valve isolates the reserve fuel from the pump inlet under normal operating conditions but a low fuel level will cause the valve to open to admit reserve fuel to the pump inlet. A float valve supplements the diaphragm controlled valve to close the reserve canister from the pump inlet when reserve fuel in the canister is near depletion.

2 Claims, 2 Drawing Sheets

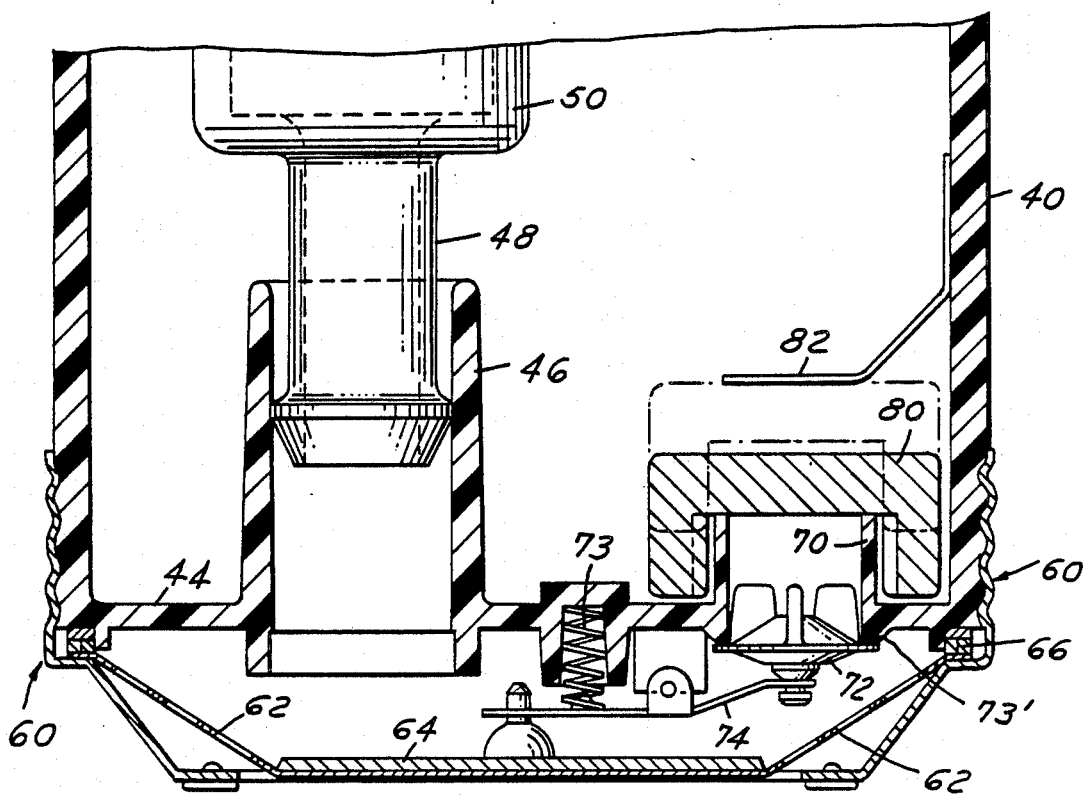
FIG. 2
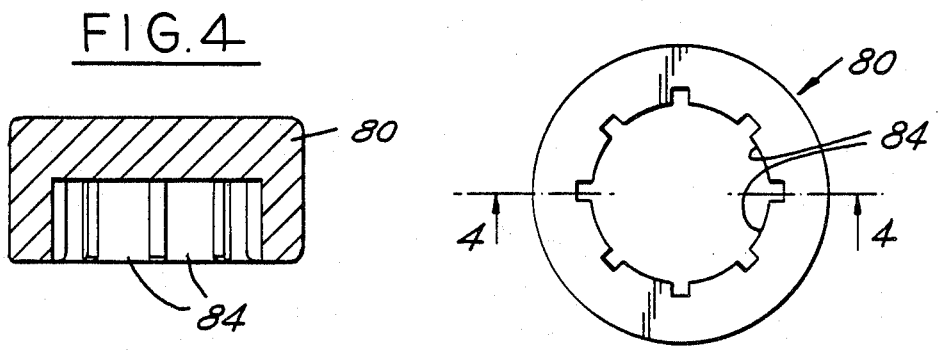
FIG. 4
FIG. 3

RESERVE FUEL SHUT-OFF VALVE

This application is a continuation-in-part of application Ser. No. 928,184, filed Nov. 7, 1986, now U.S. Pat. No. 4,747,388.

FIELD OF INVENTION

Vehicle fuel tanks which utilize in-tank canisters to house fuel pumps and provide reservoir for fuel under low fuel conditions.

BACKGROUND AND OBJECTS OF THE INVENTION

Reference is made to my copending application, Ser. No. 928,184, filed Nov. 7, 1986 on an in-tank fuel module. The disclosure in that application is that of a vertical reservoir in the form of a canister mounted upright in a portion of a vehicle fuel tank, there being an electric fuel pump in the canister which draws fuel from the bottom of the canister open to the general tank area. Overflow from the pump not used by the engine feeds back into the top of the canister through a return passage and is contained by a valve in a lower septum in the canister. The valve is usually closed but may be opened by the action of a mesh diaphragm. The diaphragm is such that it will pass fuel under normal circumstances. However, if a condition arises wherein the lower end of the canister is starved of fuel due to low fuel level and side sloshing, the diaphragm will be actuated since, due to the capillary action of the fuel, air will not readily pass the mesh diaphragm. Accordingly, the valve which retains the auxiliary fuel in the canister is opened and fuel is made accessible to the pump inlet to avoid stalling of the engine.

If for some reason the mesh diaphragm becomes clogged so that it will not pass fuel readily, the pump inlet would create a vacuum in the bottom of the canister, the valve 72 will open, and all of the reserve fuel in the canister would be drained. If this happens, the pump would start pumping air and this is an undesirable condition. The present invention has, as an object, the provision of a float valve which will close the canister volume when fuel in the canister is depleted. Thus, under most circumstances, the pump vacuum will clear the mesh diaphragm and restore normal operation of the stem.

Other objects and features of the invention will be apparent in the following description, accompanying drawings, and claims in which the invention is described together with details to enable persons skilled in the art to practice the invention, all in connection with the best mode presently contemplated for the invention.

BRIEF DESCRIPTION OF THE DRAWINGS

Drawings accompany the disclosure and the various views thereof may be briefly described as:

FIG. 2, an enlarged view of the base of the fuel canister.

FIG. 3, an end view of a float valve.

FIG. 4, a section on line 4—4 of FIG. 3.

DETAILED DESCRIPTION OF THE INVENTION AND THE MANNER AND PROCESS OF USING IT

Figure 1:
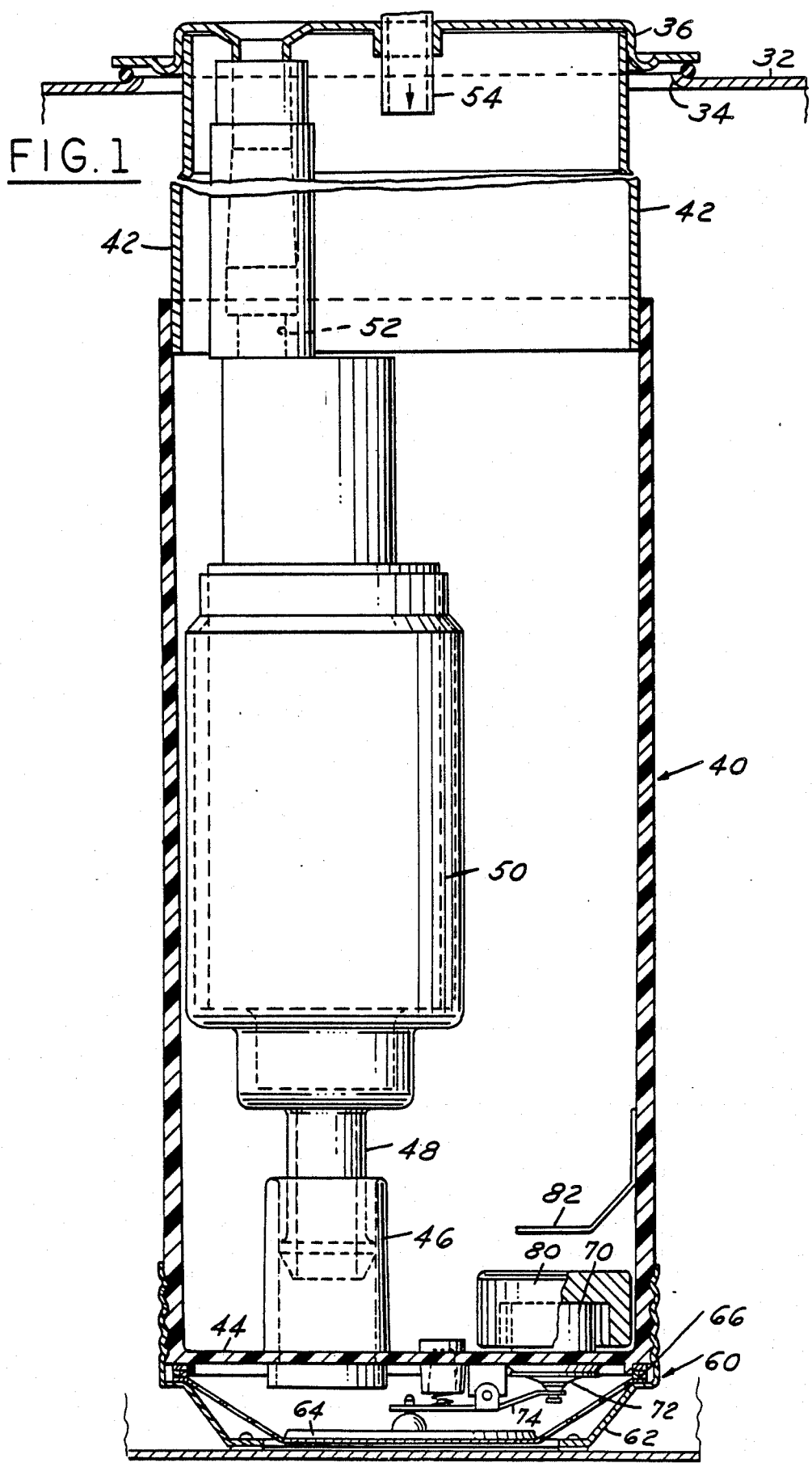
FIG. 1 illustrates a sectional view of a fuel tank and canister with the float shut off valve of the invention.

With reference to the drawings, a sectional view of an in-tank canister is shown in FIGS. 1 and 2. A fuel tank bottom 30 and top 32 is illustrated, the top having an opening 34 and a cover 36 which is suitably sealed and clamped in the opening.

A vertical canister 40 is mounted in a conventional way in the tank by legs 42 on the cover or other similar dependencies from the cover. The canister 40 has a bottom wall 44 with an upstanding turret 46 which receives, in a sealing relationship, a pump inlet 48 on the bottom of an electric rotary pump 50. The pump outlet 52 is connected through the cover 36 to a suitable fuel line leading to the engine of a vehicle. A fuel return line 54 is provided in the top 38.

At the bottom of the canister 40 is a screw-on ring 60 which, at its periphery, returns the periphery of a mesh diaphragm 62 reinforced by a central plate 64. A seal 66 is interposed at these peripheries. The wall or septum 44 also has a valve opening below a circular well 70 formed in the bottom wall 44. A valve 72 mounted on pivoted lever 74 is generally maintained in closed position by a spring 73 acting on the lever.

In general, the mesh diaphragm will pass fuel (gasoline) from the bottom of the tank to the pump inlet 46. If, however, fuel is starved from the diaphragm by a low fuel level and side sloshing, the diaphragm will be exposed to air and will not pass air because of the surface tension of the wet gasoline. This will cause the diaphragm to rise, actuating the lever 74 and opening the valve 72. Fuel from the reservoir canister can then enter the chamber above the diaphragm and reach the pump inlet 48 to maintain a flow to the engine. A full description of this action is found in the above-referenced copending application Ser. No. 928,184.

A float cap 80, in the form of an inverted cap, of buoyant material rests on the top edges of the well 70 and, in this position, closes the well and the enclosed valve seat. When fuel is in the canister reservoir, the float will ride up to a stop 82 but is trapped by the walls of the well and the stop 82.

In FIG. 2, the bottom portion of the canister is shown in greater detail. The passage 70 is formed on the wall 40 with the upstanding portion serving to locate the float valve 80. A valve seat 73' cooperates with valve 72. The float 80, as shown in FIG. 3, has internal ribs 84 and spaced slots to insure fuel flow when the valve is open. A sectional view of the float valve 80 is illustrated in FIG. 4.

Thus, when the diaphragm is not functioning to pass fuel, valve 72 will open and the reservoir will furnish fuel through well 70 and valve 72. When fuel in the reservoir lowers to a point near the top of the well 70, the float will drop and close off the pump inlet. This will prevent air from reaching the pump and fuel line. In most cases, the additional suction at the pump inlet will clear the mesh diaphragm and restore normal functioning.

If necessary the canister may be lifted from the tank, the screw cap 60 removed, and the diaphragm flushed to clear clogging material.

What is claimed is:

1. In a fuel system for vehicles which includes a fuel tank and a vertical canister mounted within the fuel tank, and a fuel pump mounted in said canister, that improvement which includes:

(a) a base plate in said canister spaced from the bottom of said tank having a first fuel inlet passage to be connected to the inlet of a pump, and having a second passage formed by a well upstanding from said base plate to admit fuel from said canister to the area below said base plate, (b) a first float valvecomprising a cap of inverted cup-shaped buoyant material construction having a base overlying said well and a peripheral wall surrounding said well to close said second passage when fuel in said canister approaches said base plate, and means positioned within said canister above said well to capture said first float valve over said well with said peripheral wall surrounding said well, (c) a second valve associated with said second passage to open and close said passage, and (d) a biased diaphragm means responsive to reduced pressure in said pump inlet connected to said second valve to open said second valve in response to lowered pressure above said diaphragm, thus allowing reserve fuel in said canister to reach said pump inlet.

2. In a fuel system for vehicles which includes a fuel tank and a vertical canister mounted within the fuel tank, and a fuel pump mounted in said canister, that improvement which includes:

(a) a base plate in said canister spaced from the bottom of said tank having a first fuel inlet passage to be connected to the inlet of a pump, and having a second passage formed by a well upstanding from said base plate to admit fuel from said canister to the area below said base plate, and (b) a first float valve comprising a cap of inverted cup-shaped buoyant material construction having a base overlying said well and a peripheral wall surrounding said well to close said second passage when fuel level in said canister approaches said base plate, and means positioned within said canister above said well to capture said first float valve over said well with said peripheral wall surrounding said well, (c) a valve seat formed at the bottom of said well beneath said base plate, (d) a second valve positioned beneath said base plate to cooperate with said valve seat, and (e) a diaphragm positioned below said base plate and is operable to open and close said second valve.

* * * * *